(12) United States Patent
Bao et al.

(10) Patent No.: US 10,951,244 B2
(45) Date of Patent: Mar. 16, 2021

(54) ELECTRONIC DEVICE

(71) Applicant: Lenovo (Beijing) Co., Ltd., Beijing (CN)

(72) Inventors: Weimin Bao, Beijing (CN); Wenlei Wang, Beijing (CN); Chang Su, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/729,207

(22) Filed: Dec. 27, 2019

(65) Prior Publication Data

US 2020/0136658 A1    Apr. 30, 2020

(30) Foreign Application Priority Data

Dec. 29, 2018   (CN) .......................... 201811634116.5

(51) Int. Cl.
| | |
|---|---|
| *H01Q 5/10* | (2015.01) |
| *H04B 1/00* | (2006.01) |
| *H04B 15/00* | (2006.01) |
| *H04M 1/03* | (2006.01) |
| *H04M 1/725* | (2021.01) |
| *H04R 1/02* | (2006.01) |

(52) U.S. Cl.
CPC ......... *H04B 1/0053* (2013.01); *H04B 15/005* (2013.01); *H04M 1/035* (2013.01); *H04M 1/72527* (2013.01); *H04R 1/025* (2013.01)

(58) Field of Classification Search
CPC ........... H04W 8/02; H04W 8/04; H04W 8/08; H04W 8/24; H04W 92/10; H04W 92/12; H04W 92/18; H04M 15/66; H04M 1/6066

See application file for complete search history.

(56) References Cited

U.S. PATENT DOCUMENTS

| | | | |
|---|---|---|---|
| 9,203,137 B1 * | 12/2015 | Guterman | ............ H01Q 1/2266 |
| 2009/0146906 A1 | 6/2009 | Anguera Pros et al. | |
| 2013/0237293 A2 | 9/2013 | Edeler | |
| 2016/0212892 A1 * | 7/2016 | Sweet | .................... G06F 1/1688 |

FOREIGN PATENT DOCUMENTS

| | | |
|---|---|---|
| CN | 103138043 A | 6/2013 |
| CN | 103219592 A | 7/2013 |
| CN | 103515699 A | 1/2014 |
| CN | 105306626 A | 2/2016 |
| CN | 105390811 A | 3/2016 |
| CN | 106471671 A | 3/2017 |
| CN | 106961005 A | 7/2017 |

* cited by examiner

*Primary Examiner* — Tu X Nguyen (74) *Attorney, Agent, or Firm* — Anova Law Group, PLLC (57) ABSTRACT

An electronic device is provided. The electronic device includes a housing, an audio output device, and a radio frequency (RF) device. The housing includes at least a conductive first portion made of a conductive material, and the conductive first portion has an opening. The audio output device is disposed in the housing and corresponding to the opening to output an audio, a space exists between the audio output device and the housing, and the audio passes through the opening to be perceived by a listener outside the housing. The radio frequency (RF) device is disposed in the space for radiating a wireless signal under a coupling effect of the opening of the conductive first portion of the housing.

20 Claims, 4 Drawing Sheets

ELECTRONIC DEVICE

CROSS-REFERENCES TO RELATED APPLICATIONS

This application claims priority of Chinese Patent Application No. 201811634116.5, filed on Dec. 29, 2018, the entire contents of which is hereby incorporated by reference.

FIELD OF THE DISCLOSURE

The present disclosure generally relates to the field of antenna technology and, more particularly, relates to an electronic device having an antenna structure.

BACKGROUND

With the evolution of technology, for the wireless transmission part, the required data throughput is getting higher and higher. Whether it is Wireless Local Area Network (WLAN) or Wireless Wide Area Network (WWAN), it has entered the transmission speed level of Gbps (Gigabits per second), and the traditional two-channel input and output has been increasingly unable to meet the needs of many products. Moreover, combined with the trend of product design, an all-metal narrow frame is more and more popular due to its beautiful appearance and good texture. But, this poses a huge challenge to antenna design. On the one hand, due to the compressed space for the antenna, and that the all-metal casing shields the wireless signals, the antenna bandwidth and efficiency can be affected. On the other hand, the number of antennas is increasing, and there are fewer and fewer spaces to place antennas. This presents a great challenge to the hardware design.

The disclosed methods and systems are directed to solve one or more problems set forth above and other problems.

BRIEF SUMMARY OF THE DISCLOSURE

One aspect of the present disclosure provides an electronic device. The electronic device includes a housing, an audio output device, and a radio frequency (RF) device. The housing includes at least a conductive first portion made of a conductive material, and the conductive first portion has an opening. The audio output device is disposed in the housing and corresponding to the opening to output an audio, a space exists between the audio output device and the housing, and the audio passes through the opening to be perceived by a listener outside the housing. The radio frequency (RF) device is disposed in the space for radiating a wireless signal under a coupling effect of the opening of the conductive first portion of the housing.

Another aspect of the present disclosure provides a method for an electronic device. The method includes providing a housing including at least a conductive first portion made of a conductive material, and the conductive first portion having an opening; and disposing an audio output device in the housing and corresponding to the opening to output an audio. A space exists between the audio output device and the housing, and the audio passes through the opening to be perceived by a listener outside the housing. The method also includes disposing a radio frequency (RF) device in the space for radiating a wireless signal under a coupling effect of the opening of the conductive first portion of the housing.

Another aspect of the present disclosure provides a user terminal. The user terminal includes a first body containing a display, and a second body connected to the first body through a connecting member, such that the first body and the second body are able to be relatively rotated through the connecting member. The second body further includes a housing, an audio output device, and a radio frequency (RF) device. The housing includes at least a conductive first portion made of a conductive material, and the conductive first portion has an opening. The audio output device is disposed in the housing and corresponding to the opening to output an audio, a space exists between the audio output device and the housing, and the audio passes through the opening to be perceived by a listener outside the housing. The radio frequency (RF) device is disposed in the space for radiating a wireless signal under a coupling effect of the opening of the conductive first portion of the housing.

Other aspects of the present disclosure can be understood by those skilled in the art in light of the description, the claims, and the drawings of the present disclosure.

BRIEF DESCRIPTION OF THE DRAWINGS

To more clearly illustrate the technical solutions of this disclosure, the accompanying drawings will be briefly introduced below. Obviously, the drawings are only part of the disclosed embodiments. Those skilled in the art can derive other drawings from the disclosed drawings without creative efforts.

DETAILED DESCRIPTION

In order to understand the features and technical contents of the embodiments of the present disclosure in more detail, the implementation of the embodiments of the present disclosure will be described in detail below with reference to the accompanying drawings. The attached drawings are for reference only and are not intended to limit the embodiments of the present disclosure.

The electronic device in the embodiments of the present disclosure may be an access terminal, a user equipment (UE), a user unit, a user station, a mobile station, a mobile terminal, a remote station, a remote terminal, a mobile device, a user terminal, a terminal, wireless communication equipment, a user proxy device, or a user device, etc. The access terminal may include a cellular phone, a cordless phone, a session initiation protocol (SIP) phone, a wireless local loop (WLL) station, a personal digital processing (PDA), a wireless communication-capable handheld device, a computing device, or any other processing device connected to a wireless modem, an in-vehicle device, a wearable device, or a terminal device, etc.

Figure 1:
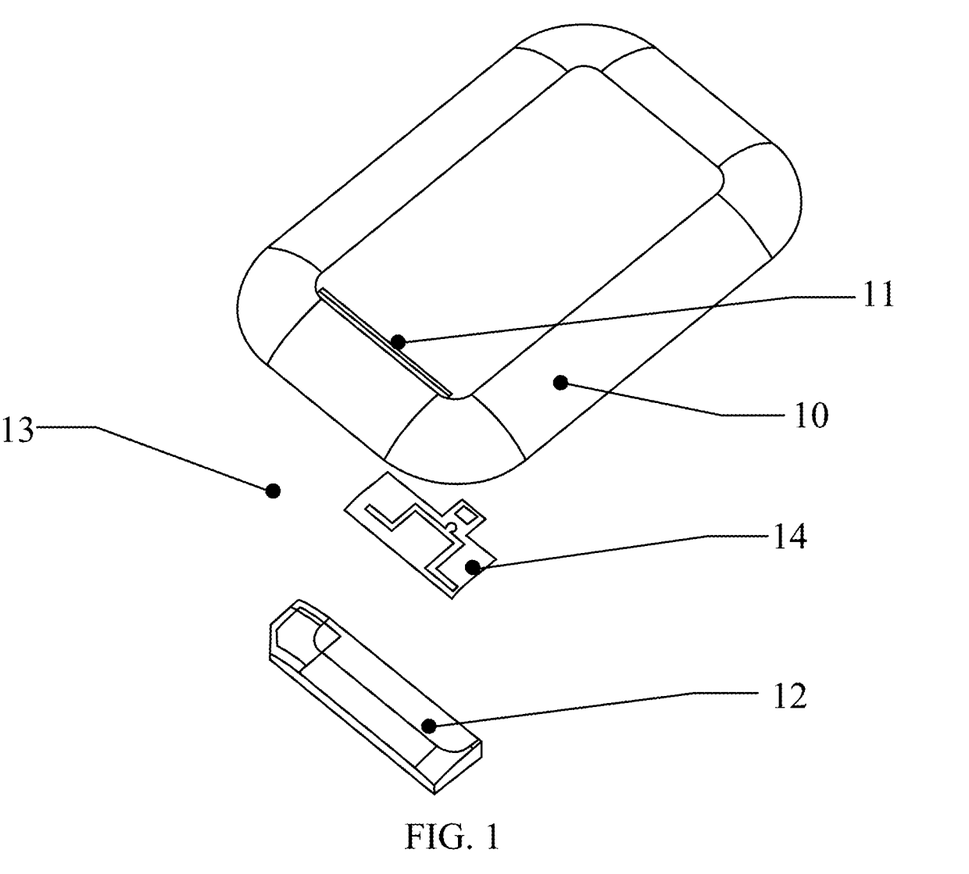
FIG. 1 illustrates a schematic structural diagram of an electronic device consistent with the disclosed embodiments.

FIG. 1 is a schematic structural diagram of an electronic device according to an embodiment of the present disclosure. As shown in FIG. 1, the electronic device includes a housing 10, an opening 11, an audio output device 12, a space 13 between the audio output device 12 and the housing 10, and a radio frequency (RF) device 14, etc.

The housing 10 includes at least a first portion made of a conductive material, and the opening 11 is on the first portion. The opening 11 may have a shape of a slit with a certain length, a groove, a circular or oval hole, a rectangular window, or any regular or irregular geometrical shape designed as the opening on the housing 10. The audio output device 12 is disposed in the housing 10 and is disposed corresponding to the opening 11. Further, the audio output device 12 is at a distance from the housing 10, and has the space 13 from the housing 10 for outputting audio through the opening 11, and the audio outputted can pass through the opening 11 to be heard by a user or listener outside the housing 10.

The RF device or antenna 14 is disposed in the space 13 and is configured to radiate a wireless signal under the coupling effect from the opening 11 on the conductive first portion of the housing 10. In certain embodiments, the housing 10 refers to a rear case of an electronic device. Here, the rear case refers to a case facing away from the screen of the electronic device, e.g., the back cover of the electronic device. In one embodiment, the housing 10 may be a full metal case. In another embodiment, a part of the housing 10 is metal.

Figure 2:
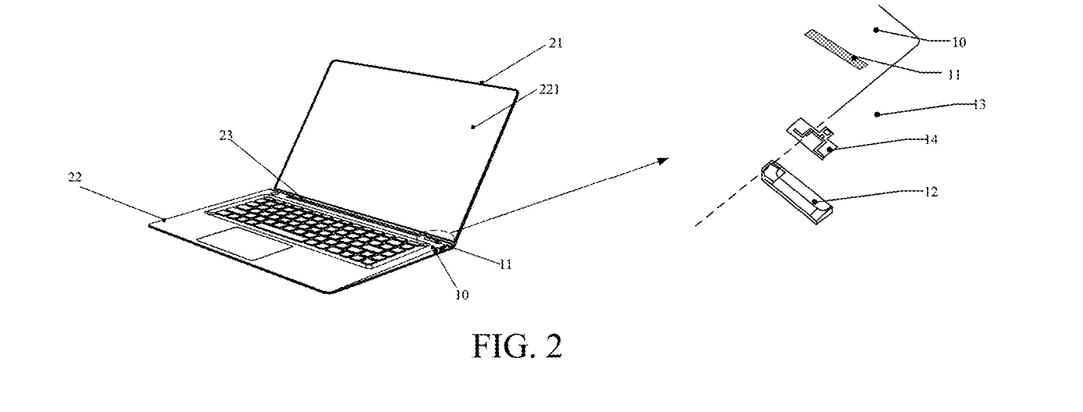
FIG. 2 illustrates another schematic structural diagram of an electronic device consistent with the disclosed embodiments.

FIG. 2 is another structural schematic diagram of an electronic device according to embodiments of the present disclosure. As shown in FIG. 2, the electronic device (e.g., a user terminal device) includes a first body 21, a second body 22, and a connecting member 23, etc.

The first body 21 and the second body 22 are connected through the connecting member 23, and the first body 21 and the second body 22 can be relatively rotated through the connecting member 23.

In one embodiment, a display device 221 is provided on the first body 21, and the display device 221 is used for displaying an interface or any information or graphics. The housing 10 is provided on the second body 22, and the housing 10 includes at least a first portion that is conductive. The first portion has an opening 11, and the opening 11 is provided on a side surface of the second body 22 or a top surface of the second body 22 facing the first body 21 (the top surface is the surface on which a keyboard is provided).

The electronic device further includes an audio output device 12, which is disposed in the housing 10 and corresponding to the opening 11, and at a distance 13 from the housing 10 for outputting audio. The audio can pass through the opening 11 to be perceived by a listener or user outside the housing 10. The electronic device also includes an RF device 14, which is disposed in the space 13 for radiating a wireless signal under the coupling effect of the opening 11 of the first portion of conductor material.

Referring to FIGS. 1 and 2, in certain embodiments, for the housing 10, at least the bottom or the lower half of the housing 10 may be made of a conductive material, and the bottom of the housing 10 has the opening 11. That is, the opening 11 is on the conductive first portion of the housing 10 at the bottom or lower half of the housing 10. The conductive material may be, for example, stainless steel, copper, aluminum, or the like.

In certain embodiments, the audio output device 12 may also be referred to as a speaker. The audio output device 12 can output audio, and the audio can be perceived by a listener outside the housing 10 through the opening 11. The audio output device 12 includes a vibration component and a magnetic component, wherein the vibration component is a conductor, and a vibration occurs under the action of a changing magnetic field generated by the magnetic component (for example, a magnetic core), thereby generating sound. It should be understood that the sound is a mechanical vibration signal, and the antenna signal is an electromagnetic vibration signal.

Figure 3:
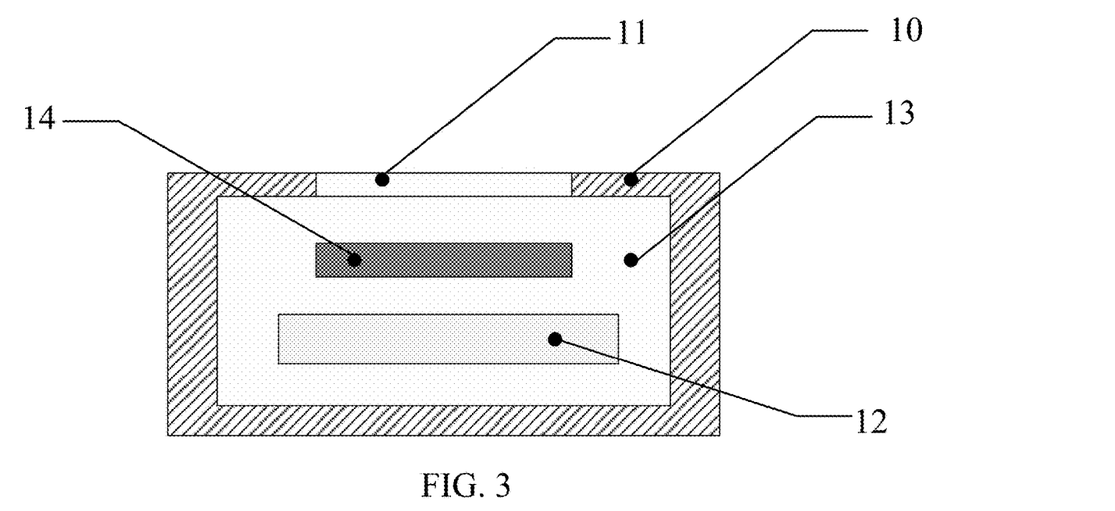
FIG. 3 illustrates another schematic structural diagram of an electronic device consistent with the disclosed embodiments.

In certain embodiments, there is a space 13 between the audio output device 12 and the housing 10 having the opening 11. FIG. 3 is a corresponding cross-sectional view. As shown in FIG. 3, the RF device 14 is disposed in the space 13 for radiating a wireless signal by the coupling effect of the opening 11 on the conductive first portion.

Further, the opening 11 can be used as a sound output hole of the audio output device 12. There is the space 13 between the audio output device 12 and the housing 10 having the opening 11, and the sound outputted from the audio output device 12 can have a cutoff frequency of the high frequency band, and produce a high frequency peak. In addition, the space 13 can also improve the intermediate frequency, reduce high frequency noise, reduce high frequency band extension, and improve sound conversion efficiency.

In certain embodiments, an RF device 14 is provided in the space 13, and the RF device 14 may be coupled with the opening 11 on the housing 10 so as to implement wireless signals of two frequency bands. Specifically, since the part of the housing 10 around the opening 11 is conductor, the opening 11 on the housing 10 can be regarded as a capacitive device, and the RF device 14 can be regarded as an inductive device. When the inductive device radiates a wireless signal (equivalent to electromagnetic waves), it is under the coupling effect of the capacitor device. In this way, the wireless signal finally radiated by the inductive device needs to consider the coupling effect of the capacitor device. The wireless signal radiated by the inductive device has two peaks in frequency, that is, the RF device 14 can radiate the wireless signals in two frequency bands. It should be noted that, at one time, the RF device 14 can only radiate wireless signals in one frequency band. An antenna control circuit of the electronic device can select which of the two frequency bands for the RF device 14 to operate in at a particular point of time.

Figure 4:
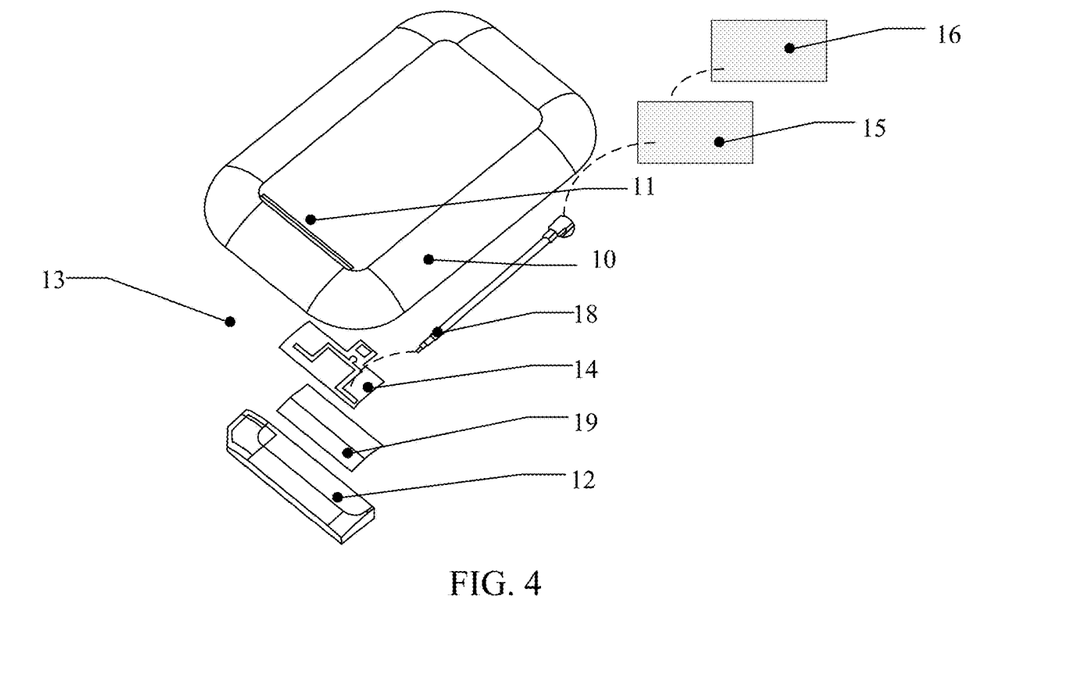
FIG. 4 illustrates another schematic structural diagram of an electronic device consistent with the disclosed embodiments.

FIG. 4 is another structural schematic diagram of an electronic device according to embodiments of the present disclosure. As shown in FIG. 4, the electronic device includes a housing 10, which includes at least a first portion made of a conductor, and the first portion has an opening 11.

The electronic device also includes an audio output device 12, which is disposed in the housing 10 at a distance and is disposed corresponding to the opening 11 for outputting audio, and a space 13 exists between the audio output device 12 and the housing 10. The audio can pass through the opening 11 to be perceived by a user or listener outside the housing 10. In certain embodiments, the space 13 forms a front sound cavity of the audio output device 12.

The electronic device also includes an RF device 14, which is disposed in the space 13 and is configured to radiate a wireless signal under the coupling effect with the opening 11 of the conductive first portion of the housing 10.

The electronic device also includes a wireless signal processing device 15, which is connected to the RF device 14 and is configured to transmit a first wireless signal between the RF device 14 and the wireless signal processing device 15. The first wireless signal is within a first frequency band, and the RF device 14 and the opening 11 of the conductive first portion supports the resonance frequency of the first frequency band through the coupling effect.

In some embodiments, the wireless signal processing device 15 is further configured to transmit a second wireless signal between the RF device 14 and the wireless signal processing device 15. The second wireless signal is within a second frequency band different from the first frequency band. The RF device 14 and the opening 11 of the conductive first portion support the resonance frequency of the second frequency band through the coupling effect.

Specifically, since the part of the housing 10 around the opening 11 is a conductor, the opening 11 on the housing 10 can be regarded as a capacitive device, and the RF device 14 can be regarded as an inductive device. When the inductive device radiates a wireless signal (equivalent to electromagnetic waves), it is under the coupling effect of the capacitor device. In this way, the wireless signal finally radiated by the inductive device needs to consider the coupling effect of the capacitor device. The wireless signal radiated by the inductive device has two peaks in frequency, that is, the RF device 14 can radiate the wireless signals in two frequency bands, which is the first wireless signal in the first frequency band and the second wireless signal in the second frequency band. It should be noted that, at one time, the RF device 14 can only radiate wireless signals in one frequency band. The antenna control circuit of the electronic device can select which of the two frequency bands for the RF device 14 to operate in. For example, the antenna control circuit selects that the RF device 14 operates in the first frequency band, and then the wireless signal processing device 15 and the RF device 14 transmit the first wireless signal located in the first frequency band. For another example, the antenna control circuit selects that the RF device 14 operates in the second frequency band, and then the wireless signal processing device 15 and the RF device 14 transmit the second wireless signal located in the second frequency band.

Further, the antenna control circuit may select whether the RF device 14 operates in the first frequency band or the second frequency band according to the current operation condition of the system of the electronic device. For example, when the system is performing a network access function, the RF device 14 can be selected to operate in the first frequency band. On the other hand, when the system is performing a voice communication function, the RF device 14 may be selected to operate in the second frequency band.

Accordingly, in certain embodiments, the electronic device may further include an antenna control circuit 16, which is connected to the wireless signal processing device 15 and is configured to control the wireless signal processing device 15 and the RF device 14 whether to transmit the first wireless signal or the second wireless signal. Further, the wireless signal processing device 15 and the RF device 14 are connected through a signal line 18, and the signal line 18 is used to transmit the first wireless signal or the second wireless signal.

In one embodiment, the RF device 14 is supported on the audio output device 12 through a connection structure 19 and is separated or insulated from a magnetic component of the audio output device 12.

The structure of the audio output device 12 generally includes a magnetic component and a coil. The magnetic component vibrates under the action of the transformed magnetic field generated by the coil, and thus emits sound due to the vibration of the magnetic component. Since the wireless signal radiated by the RF device 14 is an electromagnetic wave signal, a certain space gap is reserved between the RF device 14 and the magnetic component of the audio output device 12, and this space gap is used to avoid the electro-magnetic interference between the RF device 14 and the magnetic component of the audio output device 12. This enables the RF device 14 to radiate a high-quality wireless signal.

In certain embodiments, the perimeter or circumference of the opening 11 of the first portion may be one-half of the wavelength corresponding to the first frequency band, so that the RF device 14 and the opening 11 of the first portion are under a coupling effect to support certain resonance frequencies, including the first frequency band and the second frequency band, where the first frequency band is smaller than the second frequency band.

In certain embodiments, the specific values of the first frequency band and the second frequency band supported by the RF device 14 may be designed accordingly. Specifically, the circumference of the opening 11 may be designed to be one-half of the wavelength corresponding to the first frequency band. Provided that the first frequency band is 2.4 G, for example, the circumference of the opening 11 is $C/(2\times2.4\ G)$, where C is the speed of light. On the other hand, the design structure (length, bending structure) of the RF device 14 itself can determine the second frequency band (such as 5 G).

In certain embodiments, the housing 10 refers to a rear case of an electronic device. Here, the rear case refers to a case facing away from the screen of the electronic device, e.g., the back cover of the electronic device. In one embodiment, the housing 10 may be a full metal case. In another embodiment, a part of the housing 10 is metal.

Referring to FIGS. 1 and 2, in certain embodiments, for the housing 10, at least the bottom or the lower half of the housing 10 may be made of a conductive material, and the bottom of the housing 10 has the opening 11. The conductive material may be, for example, stainless steel, copper, aluminum, or the like.

In certain embodiments, the audio output device 12 may also be referred to as a speaker. The audio output device 12 can output audio, and the audio can be perceived by a listener outside the housing 10 through the opening 11. The audio output device 12 includes a vibration component and a magnetic component, wherein the vibration component is a conductor, and a vibration occurs under the action of a changing magnetic field generated by the magnetic component (for example, a magnetic core), thereby generating sound. It should be understood that the sound is a mechanical vibration signal, and the antenna signal is an electromagnetic vibration signal.

In certain embodiments, the RF device 14 may be formed by a metal wire having a specific structure disposed on a flexible printed circuit (FPC).

In certain embodiments, a space gap is preserved between the RF device 14 and the magnetic component of the audio output device 12, which is used to prevent interference between the magnetic component of the audio output device 12 and the RF device 14. In order to prevent the magnetic component in the audio output device 12 from interfering with the RF device 14 to radiate wireless signals, a space gap is required between the RF device 14 and the magnetic component of the audio output device 12, that is, an empty space gap is reserved in advance between the RF device 14 and the magnetic component of the audio output device 12, so as to prevent interference between the magnetic component and the RF device 14.

In certain embodiments, there is space 13 between the audio output device 12 and the housing 10 having the opening 11. Referring to the cross-sectional view shown in FIG. 3, the RF device 14 is disposed in the space 13 for radiating the wireless signal under the coupling effect with the opening 11 of the conductive first portion of the housing 10.

In certain embodiments, the wireless signal processing device 15 may also be referred to as a baseband processor, and is configured to receive a wireless signal from the RF device 14 and demodulate the wireless signal to obtain a data signal. It is also used to encode the data channel into a wireless signal and transmit the wireless signal to the RF device 14.

In certain embodiments, the RF device 14 and the opening 11 support the resonance frequencies of two frequency bands through the coupling effect, which are the resonance frequency of the first frequency band and the resonance frequency of the second frequency band. For example, one is a 2.4 G frequency band, and one is a 5 G frequency band. Although the antenna (RF device) supports two frequency bands, it can only operate in one frequency band at one time. The antenna control circuit 16 may control which frequency band for the RF device 14 to operate in at a particular point of time.

In certain embodiments, the wireless signal processing device 15 and the RF device 14 are connected by a signal line 18. In one embodiment, the signal line 18 may be a cable.

In certain embodiments, the RF device 14 is supported on the audio output device 12 through a connection structure 19. In one embodiment, the connection structure 19 may be an adhesive tape.

In certain embodiments, the circumference of the opening 11 may be designed to be one-half of the wavelength corresponding to the first frequency band. Provided that the first frequency band is 2.4 G, for example, the circumference of the opening 11 is C/(2×2.4 G), where C is the speed of light. On the other hand, the design structure (length, bending structure) of the RF device 14 itself can determine the second frequency band (such as 5 G).

Figure 6:
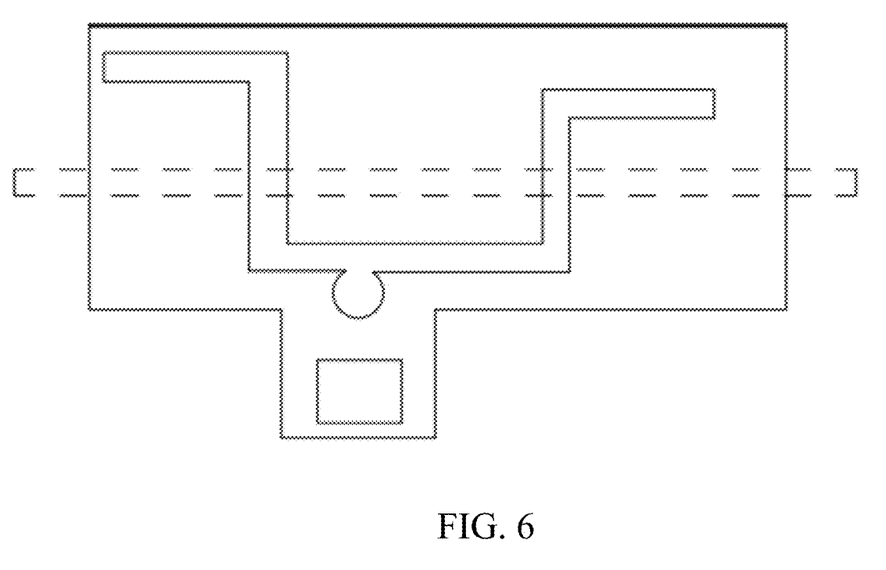
FIG. 6 illustrates a schematic structural diagram of an radio frequency device consistent with the disclosed embodiments.

For example, as shown in FIG. 6 (an enlarged version of RF device 14 shown in other drawings), the high frequency band (the second frequency band) can be implemented based on the metal trace forming the RF device 14. That is, the low frequency band can be established based on the opening 11, and the high frequency band can be implemented or adjusted based on the trace. Thus, the size of the antenna can be reduced, dual-frequency bands can be realized, and the location of the antenna can be more convenient without using any additional window on the metal case to expose the antenna to the outside, saving space and cost.

Figure 5:
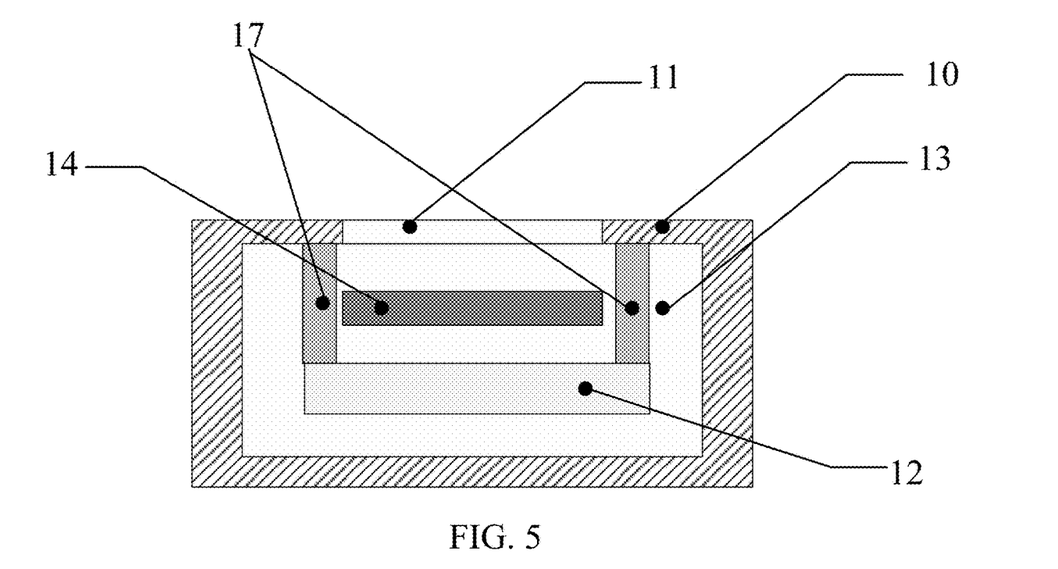
FIG. 5 illustrates another schematic structural diagram of an electronic device consistent with the disclosed embodiments.

In certain embodiments, referring to FIG. 5, two sides of the space 13 are provided with closed structures 17 for preventing the audio outputted by the audio output device 12 from being transmitted on both sides of the space 13. The closed structures 17 and The opening 11 may form an audio guide of the audio output device 12, so that the audio outputted by the audio output device 12 is transmitted along the audio guide.

Accordingly, an RF device is provided in the space between the audio output device and the casing, so that the RF device can be coupled with the opening on the casing, thereby radiating wireless signals, which meets the requirements of antenna performance and makes full use of existing space for electronic devices to support better wireless design needs.

It should be noted that, while there is no conflict, the above described technical solutions in the various embodiments of the present disclosure can be combined in any appropriate way.

Further, it should be noted that, with respect to each of the foregoing embodiments, relational terms such as first, second, and the like are only adopted to distinguish one operation, unit or module from another operation, unit or module. The relational terms do not necessarily require or imply any such actual relationship or order between the operations, units and modules. Furthermore, the terms "including", "comprising", or any other variation thereof are intended to cover a non-exclusive inclusion, such that a process, method or system that comprises a list of elements includes not only those elements, but also other elements not explicitly listed or inherent to such process, method or system. An element defined by the phrase "comprising a . . . " without further limitation does not exclude the presence of additional identical elements in the process, method or system that includes the element.

The above description of the disclosed embodiments enables those skilled in the art to make or use the disclosure. Various modifications to these embodiments are obvious to those skilled in the art. The general principles defined herein may be implemented in other embodiments without departing from the spirit or scope of the disclosure. The present disclosure is not intended to be limited to the embodiments shown herein, but is to be accorded the broadest scope consistent with the principles and novel features disclosed herein.

What is claimed is:

1. An electronic device, including:
   a housing, the housing including at least a conductive first portion made of a conductive material, and the conductive first portion having an opening;
   an audio output device disposed in the housing and corresponding to the opening to output an audio, wherein a space exists between the audio output device and the housing, and the audio passes through the opening to be perceived by a listener outside the housing; and
   a radio frequency (RF) device disposed in the space for radiating a wireless signal within a frequency band correlated to a geometric parameter of the opening such that the RF device is inductive, the RF device forming a coupling effect with the opening of the conductive first portion of the housing at a resonance frequency of the frequency band.

2. The electronic device according to claim 1, further comprising:
   a wireless signal processing device connected to the RF device for transmitting a first wireless signal with the RF device,
   wherein the first wireless signal is within a first frequency band, and the RF device and the opening on the conductive first portion of the housing support a resonance frequency of the first frequency band through the coupling effect.

3. The electronic device according to claim 2, wherein:
   the wireless signal processing device is further configured to transmit a second wireless signal with the RF device;
   the second wireless signal is within a second frequency band, different from the first frequency band; and
   the RF device and the opening on the conductive first portion of the housing support a resonance frequency of the second frequency band through the coupling effect.

4. The electronic device according to claim 3, further comprising:
an antenna control circuit connected to the wireless signal processing device and configured to control the wireless signal processing device and the RF device to transmit the first wireless signal or the second wireless signal.

5. The electronic device according to claim 2, wherein the wireless signal processing device and the RF device are connected by a signal line, and the signal line is used to transmit the first wireless signal or the second wireless signal.

6. The electronic device according to claim 2, wherein a perimeter of the opening of the first portion is one-half of a wavelength of the first frequency band, such that resonance frequencies supported by the coupling effect between the RF device and the opening on the first portion include the first frequency band and the second frequency band, wherein the first frequency band is smaller than the second frequency band.

7. The electronic device according to claim 1, wherein:
two sides of the space have closed structures for preventing audio outputted by the audio output device from being transmitted on the two sides of the space, and the closed structures and the opening form an audio guide for the audio output device, so that the audio outputted by the audio output device is transmitted along the audio guide.

8. The electronic device according to claim 1, wherein the space forms a front sound cavity of the audio output device.

9. The electronic device according to claim 1, wherein the RF device is supported on the audio output device through a connection structure, and a space gap is reserved between the RF device and a magnetic component of the audio output device.

10. The electronic device according to claim 9, wherein the space gap between the RF device and the magnetic component of the audio output device is arranged to prevent interference between the magnetic component and the RF device.

11. The electronic device according to claim 1, wherein the geometric parameter is a circumference of the opening being one-half of the wavelength corresponding to the frequency band.

12. A method for an electronic device, including:
providing a housing including at least a conductive first portion made of a conductive material, and the conductive first portion having an opening;
disposing an audio output device in the housing and corresponding to the opening to output an audio, wherein a space exists between the audio output device and the housing, and the audio passes through the opening to be perceived by a listener outside the housing; and
disposing a radio frequency (RF) device disposed in the space for radiating a wireless signal within a frequency band which is correlated to a geometric parameter of the opening such that the RF device being inductive, forming a coupling effect with the opening of the conductive first portion of the housing at a resonance frequency of the frequency band.

13. The method according to claim 12, further comprising:
connecting a wireless signal processing device to the RF device for transmitting a first wireless signal with the RF device or a second wireless signal with the RF device,
wherein the first wireless signal is within a first frequency band, and the RF device and the opening on the conductive first portion of the housing support a resonance frequency of the first frequency band through the coupling effect; the second wireless signal is within a second frequency band, different from the first frequency band, the RF device and the opening on the conductive first portion of the housing support a resonance frequency of the second frequency band through the coupling effect.

14. The method according to claim 13, further comprising:
connecting an antenna control circuit to the wireless signal processing device and controlling the wireless signal processing device and the RF device to transmit the first wireless signal or the second wireless signal.

15. The method according to claim 13, further comprising:
connecting the wireless signal processing device and the RF device by a signal line to be used to transmit the first wireless signal or the second wireless signal.

16. The method according to claim 15, further comprising:
providing closed structures on two sides of the space for preventing audio outputted by the audio output device from being transmitted on the two sides of the space, and the closed structures and the opening form an audio guide for the audio output device, so that the audio outputted by the audio output device is transmitted along the audio guide.

17. The method according to claim 12, further comprising:
supporting the RF device on the audio output device through a connection structure, and maintaining a space gap between the RF device and a magnetic component of the audio output device, wherein the space gap between the RF device and the magnetic component of the audio output device is arranged to prevent interference between the magnetic component and the RF device.

18. A user terminal, comprising:
a first body containing a display; and
a second body connected to the first body through a connecting member, such that the first body and the second body are able to be relatively rotated through the connecting member,
wherein the second body further includes:
a housing, the housing including at least a conductive first portion made of a conductive material, and the conductive first portion having an opening;
an audio output device disposed in the housing and corresponding to the opening to output an audio, wherein a space exists between the audio output device and the housing, and the audio passes through the opening to be perceived by a listener outside the housing; and
a radio frequency (RF) device disposed in the space for radiating a wireless signal within a frequency band correlated to a geometric parameter of the opening such that the RF device is inductive, the RF device forming a coupling effect with the opening of the conductive first portion of the housing at a resonance frequency of the frequency band.

19. The user terminal according to claim 18, further comprising:

a wireless signal processing device connected to the RF device for transmitting a first wireless signal with the RF device, wherein the first wireless signal is within a first frequency band, and the RF device and the opening on the conductive first portion of the housing support a resonance frequency of the first frequency band through the coupling effect.

20. The user terminal according to claim 19, wherein:

the wireless signal processing device is further configured to transmit a second wireless signal with the RF device;

the second wireless signal is within a second frequency band, different from the first frequency band; and the RF device and the opening on the conductive first portion of the housing support a resonance frequency of the second frequency band through the coupling effect.

* * * * *